US012807329B2

(12) United States Patent
Hegenbart et al.

(10) Patent No.: US 12,807,329 B2
(45) Date of Patent: Nov. 24, 2026

(54) VEHICLE WITH A CABIN COMPRISING AN ADAPTIVE RAIL SYSTEM

(71) Applicant: Airbus Operations GmbH, Hamburg (DE)

(72) Inventors: Matthias Hegenbart, Hamburg (DE); Hermann Benthien, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 325 days.

(21) Appl. No.: 18/594,422

(22) Filed: Mar. 4, 2024

(65) Prior Publication Data

US 2024/0308642 A1 Sep. 19, 2024

(30) Foreign Application Priority Data

Mar. 16, 2023 (EP) .................................... 23162417

(51) Int. Cl.
*B64F 5/10* (2017.01)
*B23P 19/10* (2006.01)

(52) U.S. Cl.
CPC ................ *B64F 5/10* (2017.01); *B23P 19/10* (2013.01)

(58) Field of Classification Search
CPC .................................. B64F 5/10; B23P 19/10
See application file for complete search history.

(56) References Cited

U.S. PATENT DOCUMENTS

2013/0126673 A1* 5/2013 Umlauft .................... B64C 1/20 244/119
2016/0130016 A1 5/2016 Goehlich et al.
2020/0094937 A1 3/2020 Linde et al.

FOREIGN PATENT DOCUMENTS

DE 102020103436 A1 * 8/2021 ............ B64D 11/00

OTHER PUBLICATIONS

English translation DE102020103436 (Year: 2020).*
European Search Report for corresponding European Patent Application No. 23162417.2 dated Aug. 22, 2023.

* cited by examiner

*Primary Examiner* — Jason L Vaughan
*Assistant Examiner* — Amanda Kreiling
(74) *Attorney, Agent, or Firm* — Greer, Burns & Crain, Ltd.

(57) ABSTRACT

A vehicle with a cabin comprising an adaptive rail system. The cabin includes a connection area adapted to hold the adaptive rail system. The adaptive rail system includes a rail interface, configured to be attachable to the connection area, at least one installation rail, configured to be attachable to the rail interface, and a jig. The jig is connected to the at least one installation rail in a moveable manner, such that a module attached to the jig is movable inside the cabin.

16 Claims, 2 Drawing Sheets

VEHICLE WITH A CABIN COMPRISING AN ADAPTIVE RAIL SYSTEM

CROSS-REFERENCES TO RELATED APPLICATIONS

This application claims the benefit of the European patent application No. 23162417.2 filed on Mar. 16, 2023, the entire disclosures of which are incorporated herein by way of reference.

FIELD OF THE INVENTION

The present invention relates to a vehicle with a cabin comprising an adaptive rail system, a method for installing a module in a cabin.

BACKGROUND OF THE INVENTION

The installation of a module in a cabin of a vehicle is limited by space and the weight or handleability of the module and can be a challenging task. The difficulties can arise due to several reasons, including the weight of the module, limited space available, and the need for precise placement.

As a result, the weight of the module can be a major challenge. Heavy modules require specialized equipment and expertise to handle them safely. Without proper equipment, installation can be hazardous to the installer and may damage the module or the vehicle.

The limited space available in the cabin can make it difficult to install the module precisely. In some cases, it may be impossible to fit the module in the available space, requiring modifications to the vehicle or the module. Precise placement is essential for the module to function properly and not interfere with other components of the vehicle.

Furthermore, the installation of heavy modules requires the expertise of professionals who are familiar with the equipment and techniques involved. Mistakes in the installation process can lead to costly repairs.

In conclusion, the installation of heavy modules in the cabin of a vehicle with limited space is a complex and challenging task. It requires specialized equipment, expertise, and careful consideration of the space available. A professional installer is recommended for the safe and successful installation of heavy modules in vehicles.

Hence, the installation of a module in a cabin of a vehicle can be cumbersome for workers due to the handleability and weight of the module. Heavy modules can cause inconveniences if not handled properly during installation. Moreover, workers may encounter difficulties in maneuvering the module in limited space. It is essential to ensure that workers are properly trained and equipped with the necessary tools and equipment to handle heavy modules safely.

SUMMARY OF THE INVENTION

It is therefore an object to facilitate the installation of a module in a cabin of a vehicle to handle heavy modules safely.

According to one aspect, a vehicle with a cabin comprising an adaptive rail system is provided. The cabin comprises a connection area configured to hold the adaptive rail system. The adaptive rail system comprises a rail interface, configured to be attachable to the connection area. The adaptive rail system further comprises at least one installation rail, configured to be attachable to the rail interface. The adaptive rail system further comprises a jig, wherein the jig is connected to the at least one installation rail in a moveable manner, such that a module attached to the jig is movable inside the cabin.

In other words, the cabin features a designated connection area designed to accommodate the adaptive rail system, which comprises a rail interface capable of attaching to the connection area. In addition, the adaptive rail system includes at least one installation rail that can be fastened to the rail interface. The adaptive rail system also includes a jig that can be movably connected to the installation rail(s), allowing a module affixed to the jig to be repositioned within the cabin.

A cabin is an enclosed structure, typically found on a vehicle, aircraft, or ship, that provides a space for passengers, crew, or goods. It can vary in size and shape, but generally refers to a compartment or room that is designed to be a comfortable or functional living or working space within the larger structure. Cabins can be found in various settings, such as a cabin on a vehicle.

A vehicle is a means of transportation used for moving people or goods from one place to another. Vehicles can be powered by various sources, such as engines fueled by gasoline, diesel, or electricity. Examples of vehicles include cars, trucks, buses, boats, aircraft, and trains. Vehicles are designed and built for specific purposes and come in a wide variety of shapes, sizes, and types depending on their intended use.

A rail system is a set of tracks or rails designed for guiding objects that move along them. Rail systems can be used for transportation of people, goods, or both. They can be powered or unpowered or gravity-fed conveyors. Rail systems are often used for efficient and reliable movement of modules or people. They can be found in various settings.

A rail interface refers to a component of a rail system that enables connection and attachment of different rail components, such as rails or fixtures. The rail interface is designed to securely hold the rail components in place, while allowing for easy and safe assembly and disassembly. Rail interfaces can come in various forms, such as connectors, clamps, or fasteners, and are typically designed to fit a specific rail system or standard. The rail interface plays an important role in ensuring the stability, safety, and functionality of the rail system as a whole.

A jig is a specialized tool or fixture that holds and guides a workpiece during a manufacturing, assembly, or inspection process. It is typically used to ensure consistent and accurate positioning of the workpiece and to aid in the execution of a specific operation or task. Jigs are often custom-designed and built to suit the specific requirements of a particular manufacturing or assembly process. They can be simple or complex in design, and can be made of various materials, such as metal, plastic, or wood. Jigs are commonly used in industries such as automotive, aerospace, and electronics manufacturing, where precision and repeatability are important.

"Movable" means able to be moved or capable of being moved from one place to another. It refers to something that can be changed in position, location or direction by physical means. Movable objects can be lifted, carried, rolled, or transported from one place to another. The term "movable" is often used in contrast to "fixed" or "immovable," which describes something that cannot be moved or is permanently attached to a specific location.

In the context of a vehicle, a module refers to a self-contained unit or component that can be added or removed as needed to enhance or modify the vehicle's functionality or performance. A module can be a physical component, such as an engine, transmission, or entertainment system, or it can be a software module that provides additional features or capabilities to the vehicle's existing software systems. Modules are designed to be easily installed or removed from the vehicle, often with minimal disruption to the rest of the vehicle's systems. This modular approach allows for greater flexibility in vehicle design and customization, and can help to reduce maintenance and repair costs by allowing specific components to be easily replaced or upgraded.

According to one embodiment, the jig comprises a jig rail, wherein the jig rail is adapted to move the jig in a direction along an axis different to an axis defined by the at least one installation rail.

According to one embodiment, the jig comprises a wheel based jig carrier, wherein the wheel based jig carrier is adapted to guide the jig along the axis defined by the at least one installation rail.

A wheel-based jig carrier is a type of device or equipment used in manufacturing or assembly processes that involves the movement of a workpiece or component from one station to another. The carrier comprises a framework or structure that supports a series of wheels or rollers, which enable the carrier to move along a track or floor. The carrier is designed to hold a jig, which in turn holds the workpiece or component in a fixed position, allowing it to be moved from one station to another while maintaining a consistent position and orientation. Wheel-based jig carriers can be used in a wide range of manufacturing or installing processes. They can be powered or non-powered, and can be manually or automatically controlled.

According to one embodiment, the jig comprises a motorized linear actuator. A motorized linear actuator is a device that converts rotational motion from an electric motor into linear motion along a straight line. It is typically used to control the position or movement of a load, such as a door, valve, or robotic arm. The linear actuator preferably comprises a motor, a gearbox, a lead screw or ball screw, and a linear slide mechanism. The motor drives the gearbox, which in turn rotates the screw, causing the slide to move along the linear path. Linear actuators can be powered by various types of electric motors, such as DC or stepper motors, and can be controlled using various feedback mechanisms, such as encoders or limit switches. They are commonly used in industrial automation, robotics, and other applications that require precise and repeatable linear motion. Preferably, the jig is movable in three dimensions.

According to one embodiment, the jig comprises a mobile robot unit.

A mobile robot unit is a type of robot that is designed to move autonomously or semi-autonomously from one location to another. The robot unit typically comprises a mobile platform or chassis, which is equipped with sensors, controllers, and actuators that allow it to navigate and interact with its environment. The platform can be driven by wheels, tracks, or legs, depending on the application and terrain.

Mobile robot units can be used in a wide range of applications. They can be programmed to perform a variety of tasks, such as transporting modules, performing inspections, or providing surveillance. Mobile robot units can be controlled using various methods, including remote control, autonomous navigation algorithms, or a combination of both. They may also be equipped with additional sensors, such as cameras or lidar, to aid in navigation and object detection.

According to one embodiment, the cabin comprises a conic section and the at least one installation rail is two installation rails, wherein the two installation rails are configured to follow a shape of the conic section of the cabin.

In other words, the cabin features a conic section and is equipped with two installation rails that are designed to conform to the shape of the cabin's conic section.

According to one embodiment, the jig is adaptable in length and/or height and/or width, such that the jig is movable along the conic section of the cabin. Due to the adaptability of the jig, the outer dimensions of the jig can be adjusted in such a manner, that the jig can be guided along the rails in any type of conicity. The adjustment in length and/or height and/or width is preferably enabled by mechanical means like an electric motor, which operate a substructure of the jig to change the shape of the jig. A substructure is a structure that allows a movement of parts of the jig relative to one another. The adjustment of the jig may also be enabled manually, for instance by shifting or relocating the substructure or other elements of the jig by hand. For instance, the adaptability is advantageous in conic shapes of a fuselage of an aircraft.

According to one embodiment, the jig comprises a crane, wherein the crane is adapted to lift the jig in a height adjustable manner.

A jig is a type of device used in manufacturing and assembly processes to hold a module or component in place during machining, welding, or other operations. It is often designed to be easily movable or adjustable, allowing it to accommodate different workpieces or process requirements. One common feature of jigs is the use of a crane to lift and move the jig to different positions.

In some cases, the crane itself may be incorporated into the design of the jig. This type of jig is often referred to as a crane jig, and it typically features a crane that is adapted to lift the jig in a height-adjustable manner. The crane may be mounted on a vertical column or mast, which can be raised or lowered to adjust the height of the jig.

The height-adjustable feature of the crane jig is particularly useful in applications where the module or component being machined or assembled is large or heavy, or where it needs to be positioned at a specific height or angle. By using a crane that is adapted to lift the jig in a height-adjustable manner, the operator can easily adjust the position of the workpiece or component to achieve the desired result.

Overall, the crane jig is a versatile and adaptable tool that is commonly used in a variety of manufacturing and assembly processes. It allows operators to hold workpieces securely in place while also providing the flexibility to move and adjust the workpiece as needed.

According to one embodiment, the rail interface is connected to a cross beam of the vehicle.

A cross beam is a structural component used in construction and engineering applications to support loads across a span or gap. It typically comprises a horizontal beam that is positioned perpendicular to the direction of the load, and is designed to transfer the load to vertical supports such as columns, walls or posts.

Cross beams are commonly used in vehicles to provide additional support and stability. They may be made of a variety of materials, depending on the application and load requirements.

In some cases, cross beams may be reinforced with additional materials such as steel plates or brackets to increase their load-bearing capacity. They may also be designed to have a specific shape or profile to accommodate different types of loads or to fit within a particular engineering design.

Overall, cross beams play an important role in the construction of many types of structures, and are a key element in ensuring the stability and safety of engineered systems.

According to one embodiment, the vehicle is an aircraft.

An aircraft is a vehicle that is designed to be able to fly through the air. There are many different types of aircraft, including airplanes, helicopters, blimps, and drones, each with their own unique characteristics and capabilities. They can vary greatly in size, from small personal aircraft to commercial airliners that can carry hundreds of passengers.

The design and operation of aircraft are subject to strict regulations and safety standards, as they involve complex systems and high speeds. As a result, the manufacturing and maintenance of aircraft are highly specialized fields, requiring skilled professionals and rigorous quality control measures.

According to one embodiment, the aircraft comprises a floor structure, wherein the floor structure comprises the connection area.

The floor structure in an aircraft refers to the system of components that support the cabin floor and provide a sturdy foundation for passenger seating, cargo storage, and other equipment. The floor structure typically includes a series of floor beams and stringers that run the length of the aircraft cabin, as well as floor panels that are attached to these beams and provide a flat surface for passengers to walk on.

The floor structure must be designed to meet stringent safety requirements, as it plays an important role in protecting passengers and crew in the event of an emergency landing or turbulence. It must be able to withstand significant stresses and forces, including the weight of passengers and cargo, as well as the impact of sudden movements or jolts.

In addition to providing structural support, the floor structure may also include a variety of systems and components to enhance the comfort and safety of passengers. These may include soundproofing materials to reduce noise levels, heating and cooling systems to maintain a comfortable temperature, and lighting and emergency evacuation systems to guide passengers in the event of an emergency.

Overall, the floor structure is a critical component of aircraft design, contributing to the safety, comfort, and functionality of the cabin environment. It requires careful engineering and construction to ensure that it meets the demanding requirements of aviation safety standards.

According to one embodiment, the aircraft comprises a triangle module defined by a fuselage and vertical struts, arranged in a lower part of the aircraft, wherein the module to be installed is configured to be installed in the triangle module.

In other words, the lower part of the aircraft features a triangle module which is defined by a fuselage and vertical struts. This module provides a stable foundation for various components to be installed within the aircraft. A separate module is designed to be installed specifically within this triangle module, ensuring a secure and integrated fit. By utilizing the available space efficiently, the aircraft can optimize its design and functionality, providing a safe and comfortable environment for passengers and crew.

According to one embodiment, the module is selected from the group of electrical power, equipment/furnishings, fire protection, flight controls, fuel system or hydraulic power.

According to another aspect, a method for installing a module in a cabin of a vehicle comprising an adaptive rail system is provided.

The method comprises the following steps. In a first step the vehicle with the cabin comprising the connection area is provided. In a second step the adaptive rail system is connected to the connection area. In a third step the module is attached to the jig. In fourth step the jig is moved to a desired location in the cabin of the vehicle. In a fifth step, the module is installed at the desired location in the cabin of the vehicle.

According to one embodiment, the method further comprises the step of removing the adaptive rail system after the step of installing the module.

Removing a rail system after installing a module with rail system may have several advantages, including:

- Reduced weight: The removal of the rail system can reduce the overall weight of the vehicle, potentially leading to improved fuel efficiency and performance.
- Increased space: Removing the rail system can create additional space in the vehicle, which can be used for other purposes such as additional storage or passenger seating.
- Flexibility: By removing the rail system, the vehicle can become more versatile and adaptable, allowing for the installation of different types of modules and equipment as needed.
- Lower maintenance costs: The removal of the rail system can simplify the maintenance process, reducing the need for specialized equipment and technicians.

Overall, removing a rail system after installing a module with rail system can offer a range of benefits that can improve the performance, efficiency, and safety of the vehicle.

DETAILED DESCRIPTION OF THE PREFERRED EMBODIMENTS

The illustrations in the figures are schematic and not to scale. If the same reference signs are used in different figures in the following description of the figures, they designate identical or similar elements. However, identical or similar elements can also be designated by different reference symbols.

Figure 1:
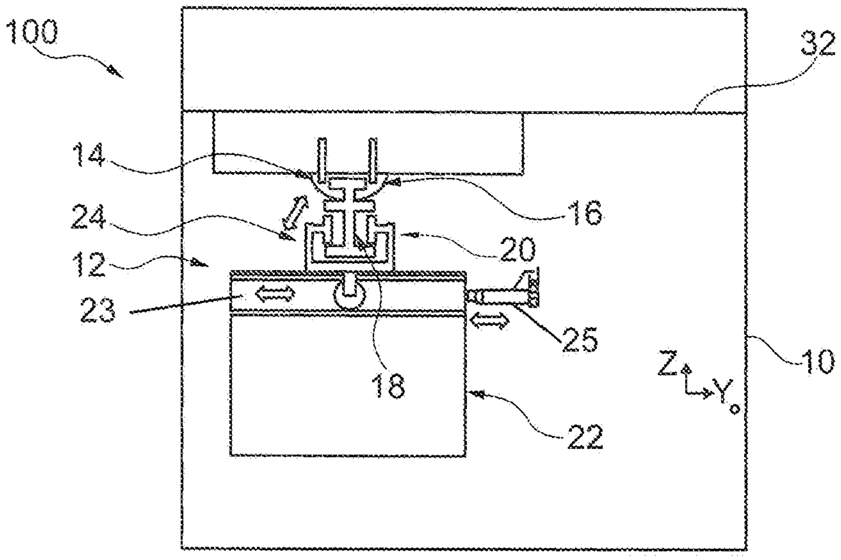
FIG. 1 shows a schematic view of a vehicle with a cabin comprising an adaptive rail system.

FIG. 1 shows a schematic view of a vehicle 100 with a cabin 10 comprising an adaptive rail system 12. The cabin 10 comprises a connection area 14 adapted to hold the adaptive rail system 12.

The adaptive rail system 12 comprises a rail interface 16, configured to be attachable to the connection area 14, wherein the rail interface 16 is connected to a cross beam 30 of the vehicle 100. The adaptive rail system 12 further comprises an installation rail 18, configured to be attachable to the rail interface 16. The adaptive rail system 12 further comprises a jig 20, wherein the jig 20 is connected to the at least one installation rail 18 in a moveable manner, such that a module 22 attached to the jig 20 is movable inside the cabin.

The jig 20 comprises a jig rail 23, wherein the jig rail 23 is configured to move the jig 20 in a direction along a Y-axis (left to right in FIG. 1) different from an X-axis (in and out of the drawing of FIG. 1) defined by the at least one installation rail 18. The jig 20 further comprises a wheel based jig carrier 24, wherein the wheel based jig carrier 24 is adapted to guide the jig 20 along the X-axis defined by the at least one installation rail 18. The jig further comprises a motorized linear actuator 25.

According to one embodiment, the jig comprises a crane 28, wherein the crane is adapted to lift the jig in a height adjustable manner along a Z-axis (up and down in FIG. 1).

The jig 20 is a type of device used in assembly processes to hold the module 22 or component in place or to be easily movable or adjustable, allowing the jig 20 to accommodate different workpieces or process requirements and to move the module 22 to different locations. A feature of the jig 20 may be the use of the crane 28 to lift and move the jig 20 to different vertical positions along the Z-axis.

In some cases, the crane 28 itself may be incorporated into the design of the jig 20. The crane 28 may be mounted on a vertical column or mast, such as at the connection area 14 and rail interface 16, as shown in FIG. 2, which can be raised or lowered to adjust the height of the jig 20.

Hence, the jig 20 is movable in three dimensions.

Further, in one embodiment, the jig 20 comprises a mobile robot unit. Such a mobile robot unit 20 is a type of robot that is configured to move autonomously or semi-autonomously from one location to another. The robot unit 20 typically comprises a mobile platform or chassis, which is equipped with sensors, controllers, and actuators that allow it to navigate and interact with its environment. The platform can be driven by wheels, tracks, or legs, depending on the application and terrain.

Figure 2:
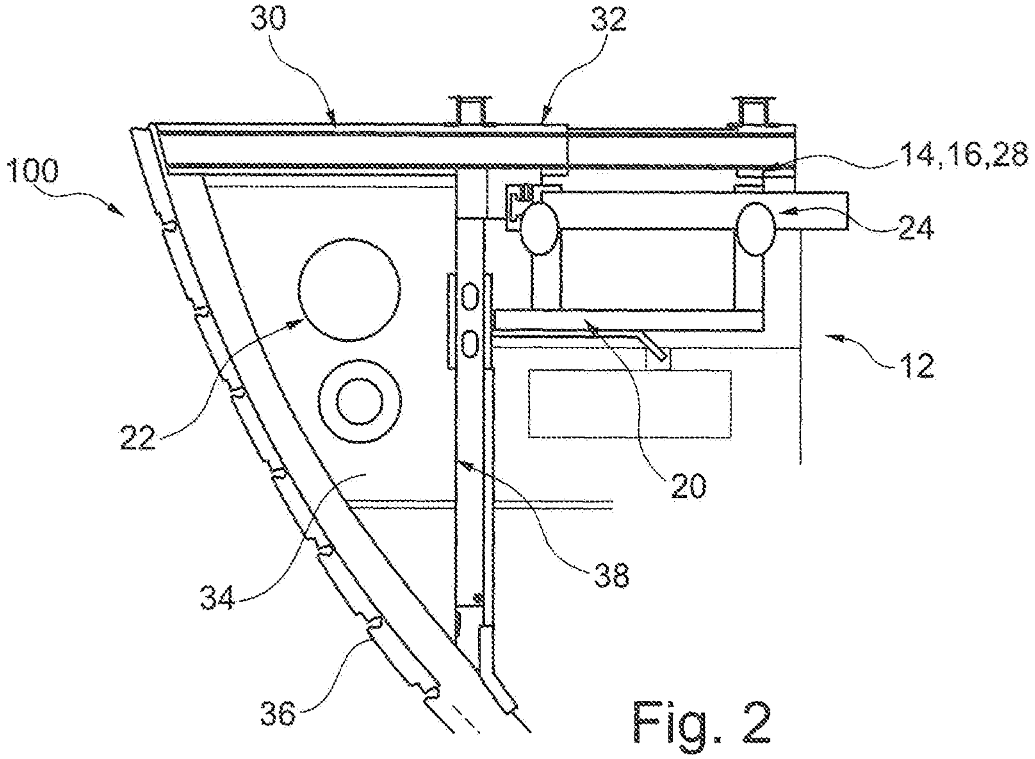
FIG. 2 shows a section of a lower part of an airplane.

FIG. 2 shows a section of a lower part of an airplane 50. The airplane 50 comprises a floor structure 32, wherein the floor structure 32 comprises the connection area 14. The airplane 50 further comprises a triangle module 34 defined by a fuselage 36 and vertical struts 38, arranged in a lower part of the aircraft 50. The module 22 to be installed is configured to be installed in the triangle module 34.

Figure 3:
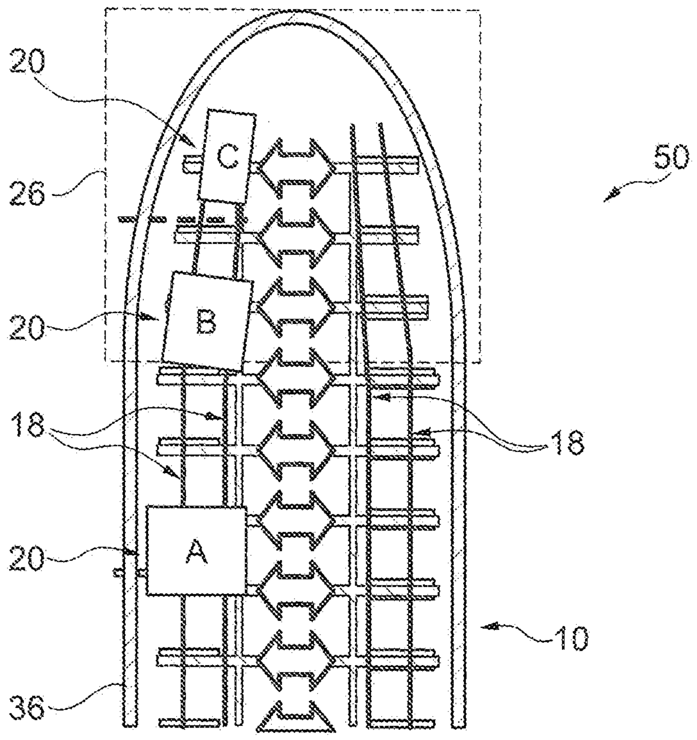
FIG. 3 shows a section of fuselage of an airplane with a conic section.

FIG. 3 shows a section of a lower part of the fuselage 36 of an airplane 50 with a cabin 10. The cabin 10 comprises a conic section 26, four installation rails 18, wherein the four installation rails 18 are configured to follow a shape of the conic section 26 of the cabin 10. The jig 20 attached to the installation rails 18 is shown in three different positions. In a first position A, the jig 20 is arranged in a section of the fuselage where all four installation rails 18 are straight and parallel to one another. If the jig 20 is moved to a position B, where the conic section 26 of the fuselage 36 begins, the available space of the jig 20 in the cabin 10 reduced. Due to the adaptability of the jig 20 in length and/or height and/or width, the outer dimensions of the jig 20 can be adjusted in such a manner, that the jig 20 can be guided along the rails by reducing the width of the jig 20. The conicity of the fuselage 36 increases until an outmost point of the fuselage 36, indicated by a position C. Since the available height for the jig 20 in the cabin 10 is also reduced at this point, the jig 20 can also be adjusted in height. In this embodiment, the adjustment in length and/or height and/or width is enabled by an electric motor (not shown), which operates a substructure of the jig 20 to change the dimensions of the jig 20.

Figure 4:
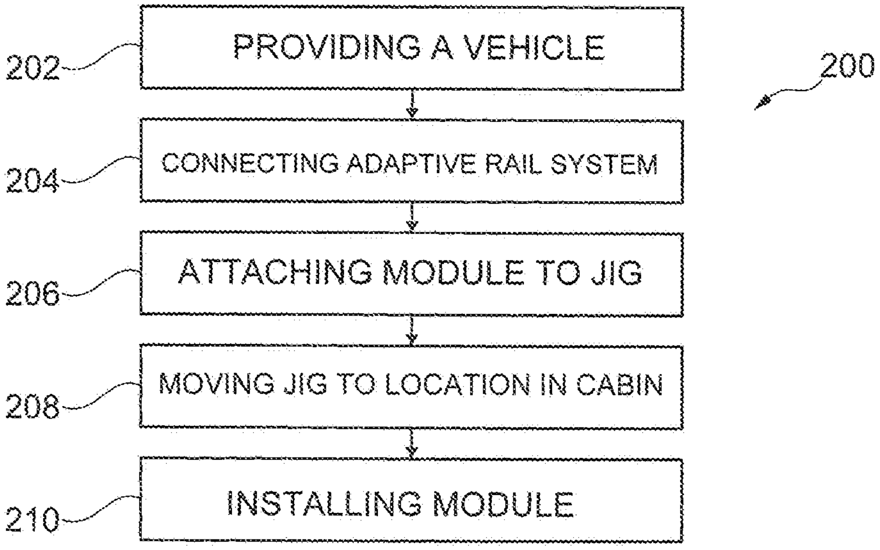
FIG. 4 shows a method for installing a module in a cabin of a vehicle.

FIG. 4 shows a method 200 for installing a module 22 in a cabin 10 of a vehicle. The method 200 for installing a module 22 in a cabin 10 of a vehicle 100 comprises an adaptive rail system 12 and comprises the following steps:

Providing 202 the vehicle 100 with the cabin 10 comprising the connection area 14, Connecting 204 the adaptive rail system 12 to the connection area 14, Attaching 206 the module 22 to the jig 20, Moving 208 the jig 20 to a desired location in the cabin 10 of the vehicle 100, Installing 210 the module 22 at the desired location in the cabin 10 of the vehicle 100.

In an optional step the method further comprises the following step:

Removing 210 the adaptive rail system 12 after the step of installing 210 the module 22.

Hence, the installation of a module in a cabin of a vehicle is facilitated to handle heavy modules safely.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

100 vehicle
10 cabin
12 adaptive rails system
14 connection area
16 rail interface
18 installation rail
20 jig, mobile robot unit
22 module
23 jig rail
24 wheel based jig carrier
25 motorized linear actuator
26 conic section
28 crane
30 cross beam
32 floor structure
34 triangle module
36 fuselage
38 vertical struts
50 aircraft
200 method
202 providing
204 connecting
206 attaching
208 moving
210 installing

The invention claimed is:

1. A vehicle with a cabin comprising an adaptive rail system, wherein the cabin comprises a connection area adapted to hold the adaptive rail system, wherein the adaptive rail system comprises:

a rail interface, configured to be attached to the connection area, at least one installation rail, configured to be attached to the rail interface, and a jig, wherein the jig is connected to the at least one installation rail in a moveable manner, such that a module attached to the jig is movable inside the cabin, wherein the jig comprises a jig rail, and wherein the jig rail is configured to move the jig in a direction along an axis different from an axis defined by the at least one installation rail.

2. The vehicle according to claim 1, wherein the jig comprises a wheel based jig carrier, and wherein the wheel based jig carrier is configured to guide the jig along an axis defined by the at least one installation rail.

3. The vehicle according to claim 1, wherein the jig comprises a motorized linear actuator.

4. The vehicle according to claim 1, wherein the jig comprises a mobile robot unit.

5. The vehicle according to claim 1, wherein the cabin comprises a conic section and the at least one installation rail is two installation rails, and wherein the two installation rails are configured to follow a shape of the conic section of the cabin.

6. The vehicle according to claim 5, wherein the jig is adaptable in at least one of length, height or width, such that the jig is movable along the conic section of the cabin.

7. The vehicle according to claim 1, wherein the jig comprises a crane, and wherein the crane is configured to lift the jig in a height adjustable manner.

8. The vehicle according to claim 1, wherein the rail interface is connected to a cross beam of the vehicle.

9. The vehicle according to claim 1, wherein the vehicle is an airplane.

10. The vehicle according to claim 9, wherein the airplane comprises a floor structure, and wherein the floor structure comprises the connection area.

11. The vehicle according to claim 10, wherein the airplane comprises a triangle module defined by a fuselage and vertical struts, arranged in a lower part of the airplane, and wherein the module to be installed is configured to be installed in the triangle module.

12. The vehicle according to claim 11, wherein the module is selected from the group consisting of electrical power, equipment/furnishings, fire protection, flight controls, fuel system or hydraulic power.

13. A method for installing a module in a cabin of a vehicle comprising an adaptive rail system according to claim 1, comprising the following steps:

providing the vehicle with the cabin comprising the connection area, connecting the adaptive rail system to the connection area, attaching the module to the jig, moving the jig to a desired location in the cabin of the vehicle, installing the module at the desired location in the cabin of the vehicle.

14. The method according to claim 13, further comprising the following step:

removing the adaptive rail system after the step of installing the module.

15. A vehicle with a cabin comprising an adaptive rail system, wherein the cabin comprises a connection area adapted to hold the adaptive rail system, wherein the adaptive rail system comprises:

a rail interface, configured to be attached to the connection area, at least one installation rail, configured to be attached to the rail interface, and a jig, wherein the jig is connected to the at least one installation rail in a moveable manner, such that a module attached to the jig is movable inside the cabin, wherein the cabin comprises a conic section and the at least one installation rail is two installation rails, and wherein the two installation rails are configured to follow a shape of the conic section of the cabin.

16. A vehicle with a cabin comprising an adaptive rail system, wherein the cabin comprises a connection area adapted to hold the adaptive rail system, wherein the adaptive rail system comprises:

a rail interface, configured to be attached to the connection area, at least one installation rail, configured to be attached to the rail interface, and a jig, wherein the jig is connected to the at least one installation rail in a moveable manner, such that a module attached to the jig is movable inside the cabin, wherein the jig comprises a crane, and wherein the crane is configured to lift the jig in a height adjustable manner.

* * * * *